(12) United States Patent
Schetzel et al.

(10) Patent No.: US 10,612,385 B2
(45) Date of Patent: Apr. 7, 2020

(54) TURBINE BLADE WITH HEAT SHIELD

(71) Applicants: Rolls-Royce Corporation, Indianapolis, IN (US); Rolls-Royce North American Technologies, Inc., Indianapolis, IN (US)

(72) Inventors: Tara G. Schetzel, Indianapolis, IN (US); Ted J. Freeman, Danville, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 413 days.

(21) Appl. No.: 15/062,670

(22) Filed: Mar. 7, 2016

(65) Prior Publication Data

US 2017/0254207 A1  Sep. 7, 2017

(51) Int. Cl.
| | |
|---|---|
| F01D 5/14 | (2006.01) |
| F01D 5/28 | (2006.01) |
| B23P 15/04 | (2006.01) |
| F01D 5/22 | (2006.01) |
| F01D 5/18 | (2006.01) |
| F01D 5/20 | (2006.01) |

(52) U.S. Cl.
CPC .............. *F01D 5/147* (2013.01); *B23P 15/04* (2013.01); *F01D 5/187* (2013.01); *F01D 5/20* (2013.01); *F01D 5/225* (2013.01); *F01D 5/284* (2013.01); *F05D 2220/32* (2013.01); *F05D 2230/237* (2013.01); *F05D 2250/241* (2013.01); *F05D 2260/2214* (2013.01); *F05D 2260/231* (2013.01); *F05D 2300/6033* (2013.01)

(58) Field of Classification Search
CPC . F01D 5/147; F01D 5/18; F01D 5/188; F01D 5/189; F01D 5/187; F01D 5/20; F01D 5/225; F01D 5/284; B23P 15/04
USPC .............. 416/96 R, 194, 195, 196 A, 196 R; 29/889.7, 889.21
See application file for complete search history.

(56) References Cited

U.S. PATENT DOCUMENTS

| | | | | |
|---|---|---|---|---|
| 4,786,234 A | * | 11/1988 | Readnour | ............... F01D 5/147 415/115 |
| 6,514,046 B1 | * | 2/2003 | Morrison | ................ F01D 5/187 416/229 A |
| 7,011,502 B2 | * | 3/2006 | Lee | .......................... F01D 5/187 416/97 R |
| 7,080,971 B2 | | 7/2006 | Wilson et al. | |
| 7,789,621 B2 | * | 9/2010 | Dierksmeier | ........... F01D 5/147 415/191 |
| 8,142,163 B1 | | 3/2012 | Davies | |
| 8,167,573 B2 | | 5/2012 | Merrill et al. | |
| 2005/0158171 A1 | | 7/2005 | Carper et al. | |
| 2007/0020105 A1 | | 1/2007 | Albrecht et al. | |

(Continued)

*Primary Examiner* — Kenneth J Hansen
*Assistant Examiner* — Justin A Pruitt
(74) *Attorney, Agent, or Firm* — Barnes & Thornburg LLP

(57) ABSTRACT

An airfoil assembly for use in a gas turbine engine is disclosed. The airfoil assembly includes a root, a tip shroud, and an airfoil located between the root and tip shroud. The airfoil includes a spar, a heat shield arranged around the spar, and a plurality of describe rigid load supports extending between the spar and the heat shield to transfer loads between the heat shield and the spar.

5 Claims, 11 Drawing Sheets

(56) References Cited

U.S. PATENT DOCUMENTS

| | | | | |
|---|---|---|---|---|
| 2008/0203236 | A1* | 8/2008 | Mazzola | F01D 5/147 244/35 R |
| 2009/0193657 | A1* | 8/2009 | Wilson, Jr. | F01D 5/147 29/889.721 |
| 2011/0110790 | A1* | 5/2011 | Itzel | F01D 5/147 416/97 R |
| 2014/0255194 | A1* | 9/2014 | Jones | F01D 5/225 416/212 A |

* cited by examiner

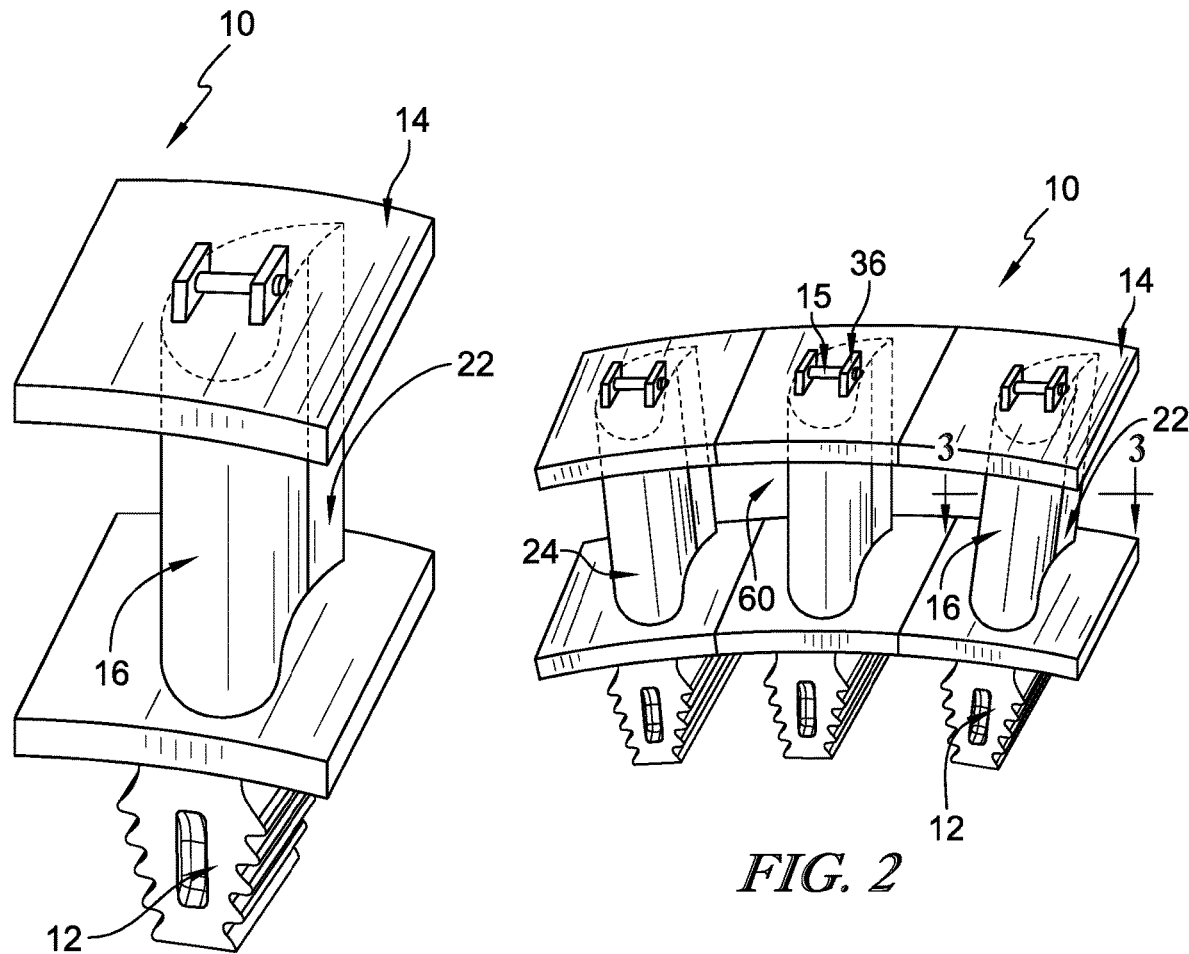
FIG. 1
FIG. 2
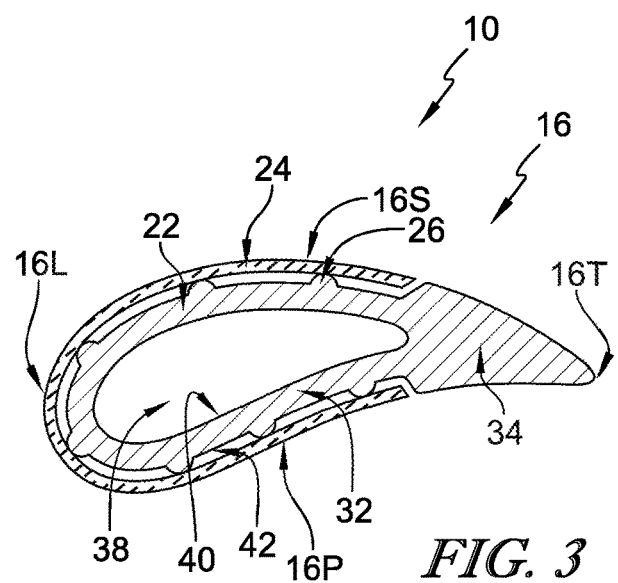
FIG. 3

TURBINE BLADE WITH HEAT SHIELD

FIELD OF THE DISCLOSURE

The present disclosure relates generally to turbine blade assemblies for gas turbine engines, and more specifically to turbine blade assemblies that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Airfoils are included in the rotating blades of the turbine to capture energy from the products of the combustor. The interaction of combustion products with the airfoils heats the airfoils. Airfoils are often made from high-temperature compatible materials and/or are actively cooled by supplying relatively cool air to the airfoils. To this end, some airfoils incorporate composite materials or heat shields to withstand very high temperatures. Design and manufacture of airfoils from composite materials presents challenges because of the geometry and strength required for the parts.

SUMMARY

The present disclosure may comprise one or more of the following features and combinations thereof.

An airfoil may be adapted for use in a gas turbine engine. The airfoil may include a spar, a heat shield, and a plurality of load supports. The spar may comprise metallic materials and may be formed to include a core body and a tail. The tail may be shaped to form a trailing edge of the airfoil. The heat shield may comprise ceramic materials and may be shaped to extend around the core body to form a leading edge, a forward portion of a pressure side of the airfoil, and a forward portion of a suction side of the airfoil. The heat shield may be located in spaced-apart relation to the core body to define cooling passages between the spar and the heat shield. The plurality of rigid load supports may extend between the spar and the heat shield to transfer loads from the heat shield to the spar during use in the gas turbine engine while maintaining the cooling passages between the spar and the heat shield.

In some embodiments, the heat shield may form a majority of the pressure side and a majority of the suction side of the airfoil. In some embodiments, the tail of the spar may be shaped to form an aft portion of the suction side and an aft portion of the pressure side.

In some embodiments, the core body of the spar may include a cavity, an inner surface facing the cavity, an outer surface facing away from the cavity, and a plurality of vent holes. The vent holes may extend through the inner surface and the outer surface of the core body and open into the cooling passages.

In some embodiments, an aft portion of the suction side of the heat shield may be spaced apart from the tail of the spar to define a first outlet that opens into the cooling passages. In some embodiments, the aft portion of the pressure side of the heat shield may be spaced apart from the tail of the spar to define a second outlet that opens into the cooling passages.

In some embodiments, the core body may include a forward spar portion and an aft spar portion spaced-apart from the forward spar portion to define a heat shield channel therebetween. A portion of the heat shield may extend into the heat shield channel.

In some embodiments, a portion of the heat shield may interlock with the core body to form a dovetail joint. In some embodiments, the heat shield may interlock with the tail.

In some embodiments, a suction side portion of the heat shield may be located between the tail and the core body. In some embodiments, the heat shield may include a first end located on the pressure side of the airfoil and a second end located on the suction side of the airfoil. At least one of the first end and the second end may be received by the tail to form a dovetail joint.

In some embodiments, the rigid load supports may include at least one of a radially extending rib and a discrete generally hemi-spherical support. In some embodiments, the core body may be formed to include the plurality of rigid load supports.

According to another aspect of the present disclosure, an airfoil may include a spar and a heat shield. The spar may comprise metallic materials and may be formed to include a core body and a tail. The tail may be shaped to form an aft portion of a pressure side of the airfoil, an aft portion of a suction side of the airfoil, and a trailing edge of the airfoil. The heat shield may comprise ceramic materials and may be shaped to extend around the core body to form a leading edge of the airfoil, a forward portion of the pressure side of the airfoil, and a forward portion of the suction side of the airfoil. The forward portion of the pressure side may be greater than half of the pressure side and the forward portion of the suction side may be greater than half of the suction side.

In some embodiments, a plurality of rigid load supports may extend between the spar and the heat shield. The rigid load supports may include at least one of a radially extending rib and a discrete generally hemi-spherical support.

In some embodiments, the core body may include a cavity. The tail may be formed to include a trailing edge vent passage that extends from the cavity to the trailing edge.

According to another aspect of the present disclosure, a turbine-blade assembly may include a root, an airfoil, and a tip shroud. The root may include a root platform and a stem adapted to attach the turbine-blade assembly to the gas turbine engine for rotation about a central axis of the gas turbine engine. The airfoil may include a spar and a heat shield. The spar may comprise metallic materials and the heat shield may comprise ceramic materials. The spar may extend outward from the root platform and may be formed to include a core body, a tail forming a trailing edge of the airfoil, and an airfoil retainer extending outwardly away from the core body. The heat shield may be shaped to extend around the core body to form a leading edge, a forward portion of a pressure side of the airfoil, and a forward portion of a suction side of the airfoil. The heat shield may be located in spaced-apart relation to the core body to define cooling passages between the spar and the heat shield. The tip shroud may be spaced-apart from the root. The tip shroud may be formed to include an airfoil retainer aperture extending through the tip shroud. The airfoil retainer aperture may be configured to receive the airfoil retainer of the spar therethrough to couple the spar to the tip shroud.

In some embodiments, the airfoil may further include a plurality of discrete rigid load supports that extend between the spar and the heat shield. In some embodiments, the airfoil retainer may include a first knife edge configured to couple the airfoil retainer to the spar, an insert pin, and an aperture arranged to receive the insert pin so the tip shroud is located between the insert pin and the core body. In some embodiments, the airfoil retainer may be brazed to the tip shroud to couple the spar to the tip shroud.

These and other features of the present disclosure will become more apparent from the following description of the illustrative embodiments.

BRIEF DESCRIPTION OF THE DRAWINGS

FIG. 1 is a perspective view of a portion of a turbine-blade assembly in accordance with the present disclosure showing that the turbine-blade assembly includes a root, a tip shroud located in spaced-apart relation to the root, and an airfoil located between the root and the tip shroud;

FIG. 2 is a view of a portion of a turbine shroud that includes a plurality of the turbine-blade assemblies of FIG. 1;

FIG. 3 is a sectional view of an airfoil taken along line 3-3 of FIG. 2 showing that the airfoil includes a spar and a heat shield arranged around a portion of the spar to define cooling passages therebetween, and a plurality of discrete rigid load supports extending between the core body and the heat shield;

DETAILED DESCRIPTION OF THE DRAWINGS

Figure 4:
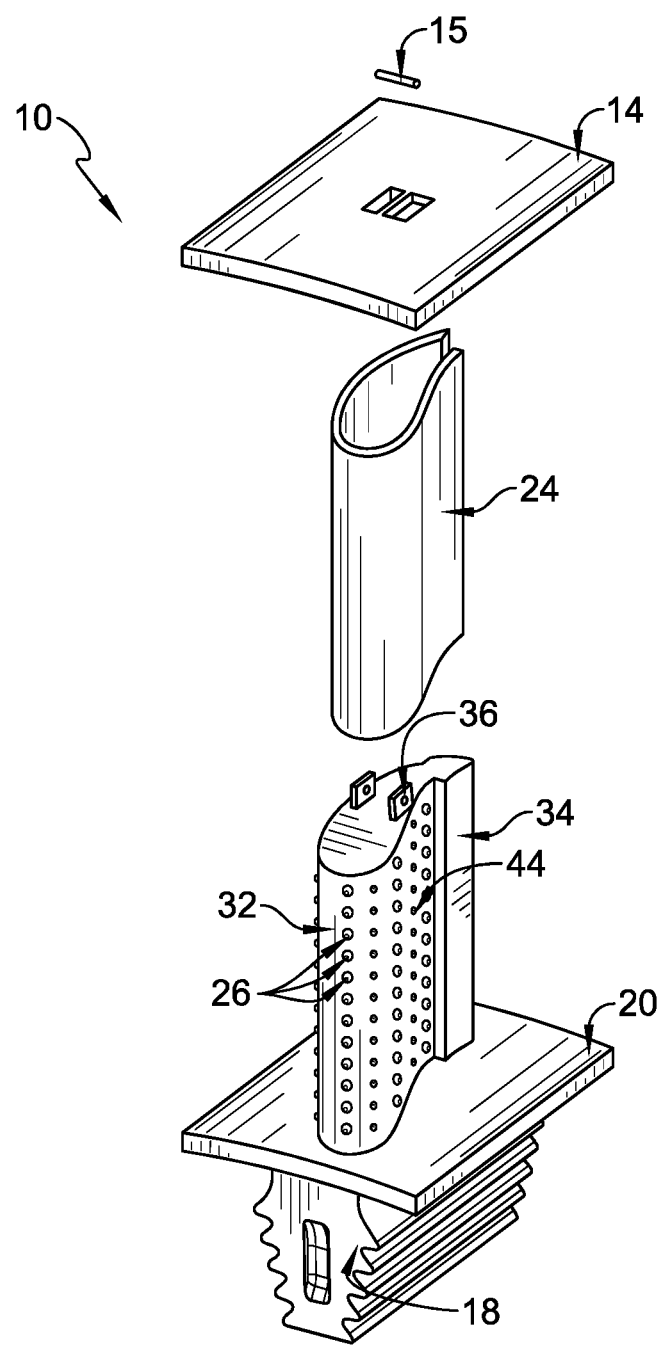
FIG. 4 is an exploded assembly view of the turbine-blade assembly of FIG. 2 showing, from bottom to top, the root, a platform, the spar extending radially outward away from the root and being formed to include the plurality of discrete rigid load supports and a plurality of vent holes arranged to open into the cooling passages, the heat shield, the tip shroud, and an insert pin configured to couple the spar to the tip shroud.

For the purposes of promoting an understanding of the principles of the disclosure, reference will now be made to a number of illustrative embodiments illustrated in the drawings and specific language will be used to describe the same.

An illustrative turbine-blade assembly 10 is shown in FIG. 1. The turbine-blade assembly 10 includes a root 12, a tip shroud 14, and an airfoil 16 extending between the root 12 and the tip shroud 14 as shown in FIG. 1. Illustratively, the root 12 is arranged to couple the turbine-blade assembly 10 to a rotor for rotation about a central axis of a gas turbine engine. The tip shroud 14 is spaced-apart radially from the root 12 to locate the airfoil 16 therebetween.

The airfoil 16 includes a leading edge 16L, a trailing edge 16T, a pressure side 16P, and a suction side 16S as shown in FIG. 3. The illustrative airfoil 16 includes a spar 22, a heat shield 24, and a plurality of rigid load supports 26 as shown in FIG. 3. The spar 22 comprises metallic material and forms the trailing edge 16T of the airfoil 16. The heat shield 24 is arranged around a portion of the spar 22 to help withstand high temperatures of the gasses passing over the airfoil 16 while exposing the metallic trailing edge 16T. The rigid load supports 26 extend between the spar 22 and the heat shield 24 to transfer loads between the heat shield 24 and the spar 22 during operation of the turbine-blade assembly 10. In the illustrative embodiment, the rigid load supports 26 generally hemi-spherical supports. In other embodiments, the rigid load supports comprise radially extending ribs.

The root 12 of the turbine-blade assembly 10 includes a mount 18 and a platform 20 as shown in FIGS. 2 and 4. In some embodiments, the mount 18 is configured to interlock with a rotor to couple the turbine-blade assembly 10 to the rotor for rotation therewith. The platform 20 extends circumferentially away from the mount 18.

In the illustrative embodiment, the spar 22 comprises metallic materials and is formed to include a core body 32, a tail 34, and an airfoil-retainer 36 as shown in FIGS. 3 and 4. The core body 32 is arranged to support the heat shield 24. The tail 34 extends axially away from the core body 32 and forms the trailing edge 16T of the airfoil 16. The airfoil retainer 36 is configured to couple the spar 22 to the tip shroud 14.

Figure 5:
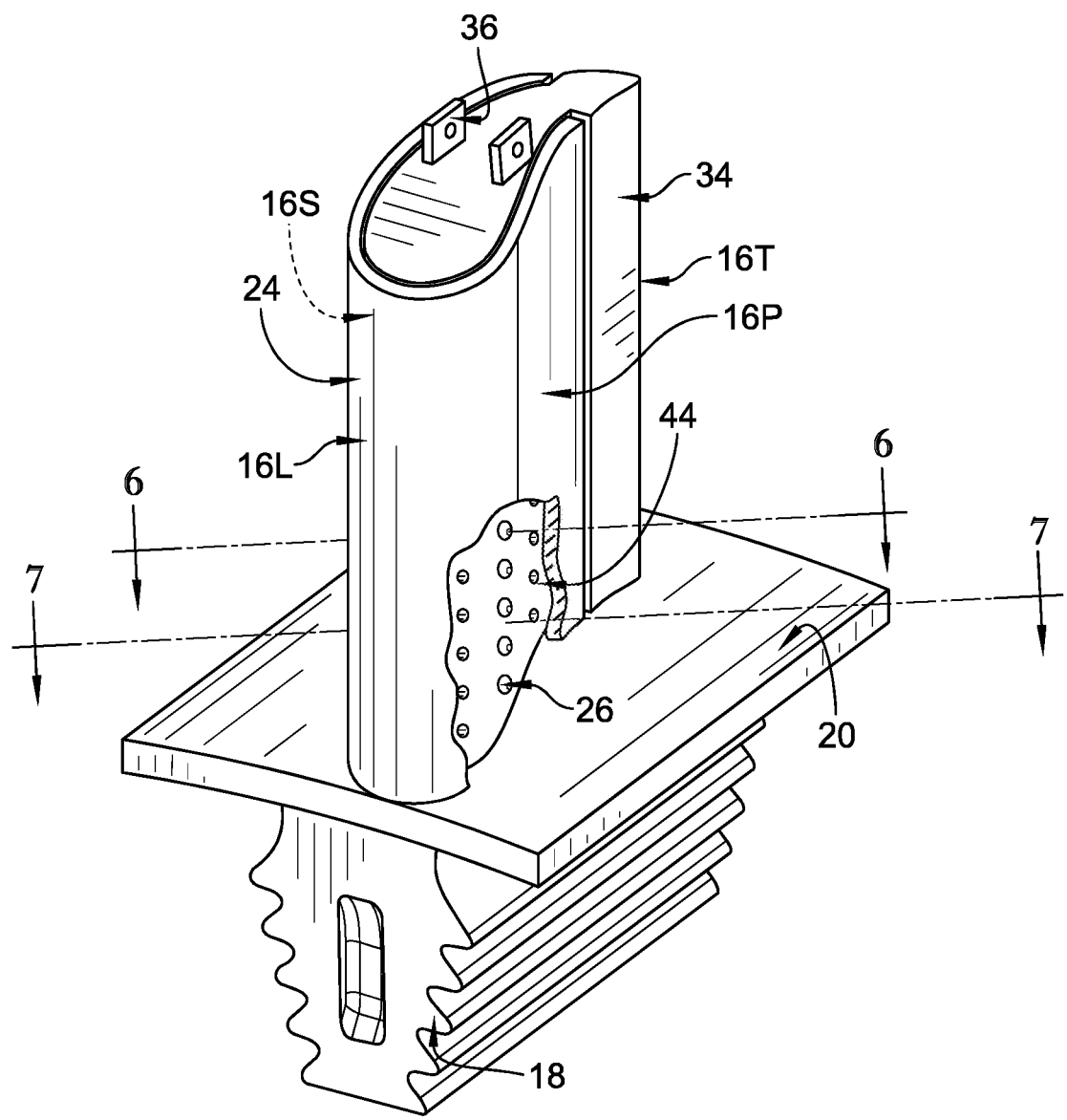
FIG. 5 is a perspective view of the airfoil of FIGS. 2-4, showing that the heat shield forms a leading edge, a portion of a suction side, and a portion of a pressure side of the airfoil and that the tail of the spar forms the trailing edge of the airfoil, a portion of the heat shield is broken away to reveal the discrete rigid load supports extending outwardly from the spar and the vent holes formed in the core body.
Figure 7:
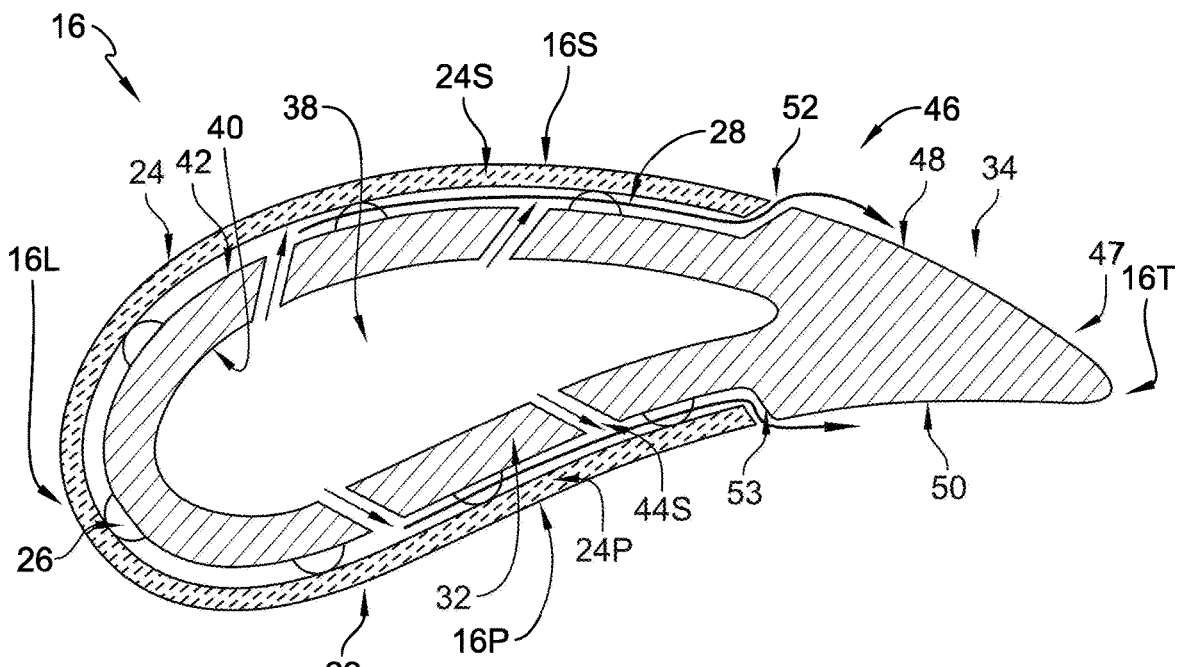
FIG. 7 is a sectional view taken along line 7-7 of FIG. 5 showing the cooling passages defined between the heat shield and the spar and that the vent holes that extend through the core body open into the cooling passages to allow cooling air to pass through the spar and into the cooling passages to cool the airfoil.

The core body 32 is formed to include a cavity 38, an inner surface 40, an outer surface 42, and a plurality of vent holes 44 as shown in FIGS. 3-5. The cavity 38 is formed to minimize a weight of the spar 22 and to provide a passage for cooling air to enter into the airfoil 16. The inner surface 40 of the core body 32 is arranged to define the cavity 38 and, thus, the inner surface 40 faces the cavity 38. The outer surface 42 is spaced apart from the inner surface 40 and faces away from the cavity 38 towards the heat shield 24. Each of the plurality of vent holes 44 extend through the core body 32 between the inner surface 40 and the outer surface 42 and open into the cooling passages 28 as shown in FIG. 7. As such, the cooling air directed into the cavity 38 of the core body 32 is conducted out of the core body 32 through the vent holes 44 to cool the heat shield 24 and the outer surface 42 of the spar 22 as suggested in FIG. 7.

The tail 34 includes a first end 46 coupled to the core body 32, a second end 47 spaced apart axially from the first end 46, a first tail surface 48, and a second tail surface 50 as shown in FIGS. 5 and 7. The first tail surface 48 extends between and interconnects the first end 46 and the second end 47 of the tail 34. The first tail surface 48 is arranged to form an aft portion of the suction side 16S of the airfoil 16. The second tail surface 50 extends between and interconnects the first end 46 and the second end 47 of the tail 34. The second tail surface 50 is arranged to form an aft portion of the pressure side 16P of the airfoil 16. The first tail surface 48 and the second tail surface 50 converge at the second end 47 to form the trailing edge 16T of the airfoil 16 at the second end 47.

Figure 6:
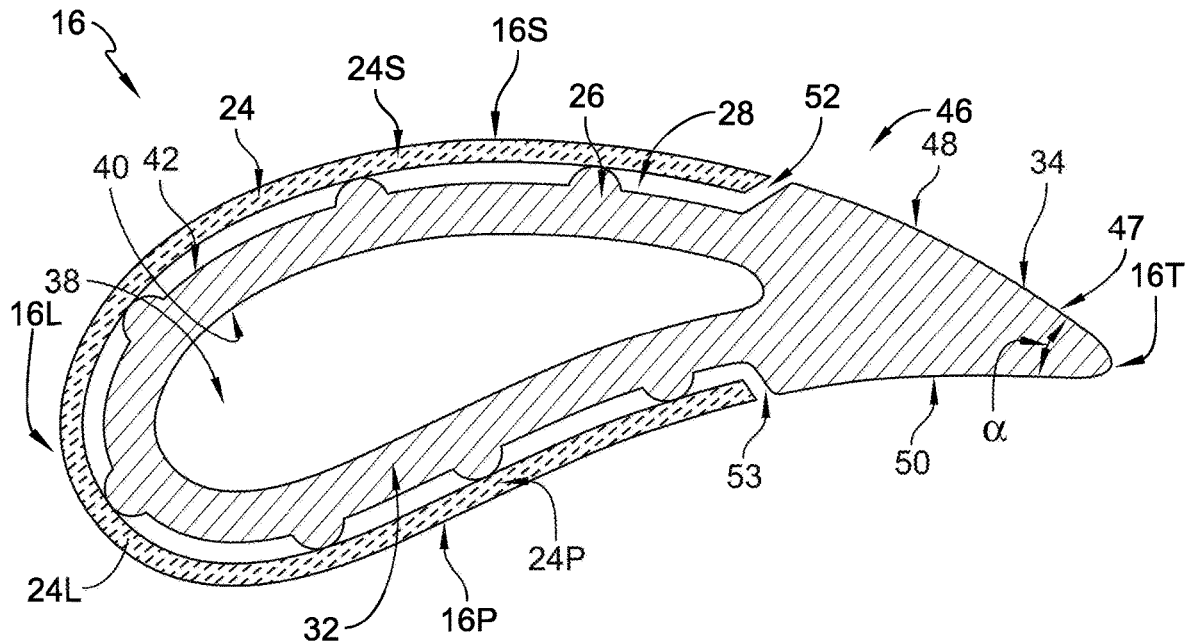
FIG. 6 is a sectional view taken along line 6-6 of FIG. 5 showing the spar, the heat shield arranged around the spar, and a number of the discrete rigid load supports extending between the spar and the heat shield.

The first and second tail surfaces 48, 50 cooperate to define an angle alpha therebetween as shown in FIG. 6. The angle alpha may be relatively small compared to angles of tails formed by airfoils comprising other materials such as, for example, ceramic material. In some embodiments, the metallic material in the spar 22 may allow the angle alpha to be relatively small due to a relatively high strength of the metallic materials. As one example, in airfoils having a ceramic shield arranged around the trailing edge of the airfoil, the ceramic shield may have a relatively larger angle alpha due to the limitations of ceramic materials.

In some embodiments, the angle alpha is between about 1 degree and about 15 degrees. In some embodiments, the angle alpha is between about 2 degrees and about 10 degrees. In some embodiments, the angle alpha is between about 4 degrees and about 6 degrees. In the illustrative embodiment, the angle alpha is about 5 degrees.

The heat shield 24 is arranged around a portion of the spar 22 to withstand high temperatures of the gasses passing over the airfoil 16. The heat shield 24 is generally open-ended and includes a leading edge segment 24L, a suction side segment 24S, and a pressure side segment 24P as shown in FIGS. 3-7.

The leading edge segment 24L forms the leading edge 16L of the airfoil 16 as shown in FIG. 6. The suction side segment 24S forms a forward portion of the suction side 16S of the airfoil 16. The suction side segment 24S of the heat shield 24 cooperates with the first tail surface 48 of the tail 34 of the spar 22 to define the suction side 16S of the airfoil 16. The pressure side segment 24P forms a forward portion of the pressure side segment 16P of the airfoil 16. The pressure side segment 24P of the heat shield 24 cooperates with the second tail surface 50 of the tail 34 of the spar 22 to define the suction side 16S of the airfoil 16.

In an illustrative embodiment, the suction side segment 24S forms a majority of the suction side 16S of the airfoil and the pressure side segment 24P forms a majority of the pressure side 16P of the airfoil 16. In another illustrative embodiment, the suction side segment 24S forms at least half of the suction side 16S of the airfoil and the pressure side segment 24P forms at least half of the pressure side 16P of the airfoil 16.

In the illustrative embodiment, the heat shield 24 is a composite adapted to withstand very high operating temperatures that may not be possible for metallic components. More specifically, the heat shield 24 comprises a ceramic matrix composite (CMC). In some embodiments, the heat shield 24 is made from a SiC—SiC ceramic matrix composite including a silicon carbide matrix and silicon carbide fibers. For purposes of this application, a ceramic-containing material is any monolithic ceramic or composite in which at least one constituent is a ceramic.

The plurality of rigid load supports 26 are configured to transfer loads from the heat shield 24 to the spar 22 as suggested in FIG. 6. In the illustrative embodiment, the plurality of rigid load supports 26 are discrete load supports 26 as shown in FIGS. 4 and 5. In the illustrative embodiment, each load support 26 is semi-hemispherical, as shown in FIGS. 3-7.

In other embodiments, the load supports 26 comprise ribs. Some ribs may extend radially between a hub and tip of the airfoil 16 while other ribs extend radially partway between the hub and tip of the airfoil 16. In other embodiments, the ribs extend axially. In some embodiments, the radially extending ribs have a half circle cross-section when viewed radially inward. In other embodiments, the load supports 26 may include semi-hemispherical supports and radially extending ribs.

In the illustrative embodiment, the core body 32 of the spar 22 is formed to include the plurality of discrete rigid load supports 26 and the load supports 26 extend toward the heat shield 24. In some embodiments, the load supports 26 and the core body 32 are monolithically formed. In other embodiments, heat shield 24 is formed to include the plurality of discrete rigid load supports 26 and the load supports 26 extend toward the core body 32. In some embodiments, the heat shield 24 and the load supports 26 are monolithically formed.

The heat shield 24 is spaced apart from the core body 32 of the spar 22 to form cooling passages 28 as shown in FIGS. 6 and 7. The cooling air directed into the spar 22 is directed from the cavity 38 of the core body 32 through the plurality of vent holes 44 and into the cooling passages 28 as suggested in FIG. 7. The cooling passages 28 direct the cooling air along the outer surface 42 of the core body 32 to cool the outer surface 42 of the core body 32. The cooling air flowing through the cooling passages 28 cause the metallic spar 22 to experience a relatively lower temperature than the heat shield 24.

The aft portion of each of the suction side 24S and pressure side 24P is spaced-apart from the tail 34 as shown in FIGS. 3, 6, and 7. The aft portion of the suction side 24S of the heat shield 24 is spaced-apart from the tail 34 to define a first outlet 52 that opens into the cooling passages 28. The aft portion of the pressure side 24P of the heat shield 24 is spaced-apart from the tail 34 to define a second outlet 53 that opens into the cooling passages 28. The cooling air exits the cooling passages 28 through the outlets 52, 53 formed between the heat shield 24 and the tail 34 to cool the first tail surface 48, the second tail surface 50, and the trailing edge 16T of the tail 34. In an embodiment, the airfoil 16 only has one of the outlets 52, 53 selected from the first outlet 52 and the second outlet 53.

Figure 8:
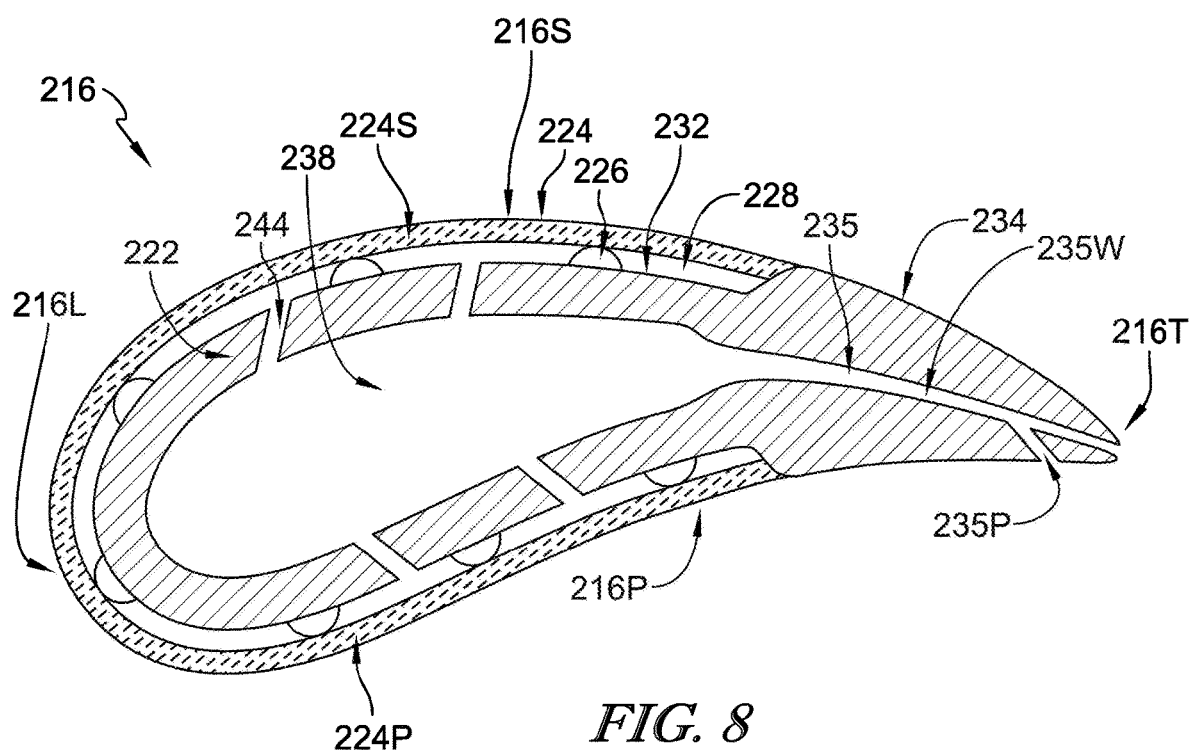
FIG. 8 is a sectional view similar to FIG. 6 of another embodiment of an airfoil in accordance with the present disclosure.

Another illustrative airfoil 216 adapted for use in a gas turbine engine is shown in FIG. 8. The airfoil 216 is substantially similar to the airfoil 16 shown in FIGS. 1-7 and described herein. Accordingly, similar reference numbers in the 200 series indicate features that are common between the airfoil 16 and the airfoil 216. The description of the airfoil 16 is hereby incorporated by reference to apply to the airfoil 216, except in instances when it conflicts with the specific description and drawings of the airfoil 216.

The airfoil 216 includes a spar 222, a heat shield 224, and a plurality of load supports 226 as shown in FIG. 8. The spar 222 includes a core body 232, a tail 234, and a plurality of vent passages 235 as shown in FIG. 8. The vent passages 235 are formed to include a tail passageway 235W and a pressure-side passageway 235P as shown in FIG. 8. The tail passageway 235W opens into the cavity 238 of the core body 232 and extends from the cavity 238 to the trailing edge 216T of the airfoil 216. The pressure-side passageway 235P extends between the tail passageway 235W and the second side 250 of the tail 234 and opens into the pressure side 216P of the airfoil 216.

The vent passages 235 are configured to allow cooling air to pass from the cavity 238 through the tail passageway 235W to cool the trailing edge 216T of the airfoil 216 as shown in FIG. 8. A portion of the cooling air in the tail passageway 235W is diverted to the pressure-side passageway 235P to cool the aft end of the pressure side 216P of the tail 234. The spar 222 includes at least one tail passageway 235W and at least one pressure-side passageway 235P. In other embodiments, the vent passages 235 further include a suction-side passageway that extends from the tail passageway 235W to the suction side of the airfoil 16.

Figure 9:
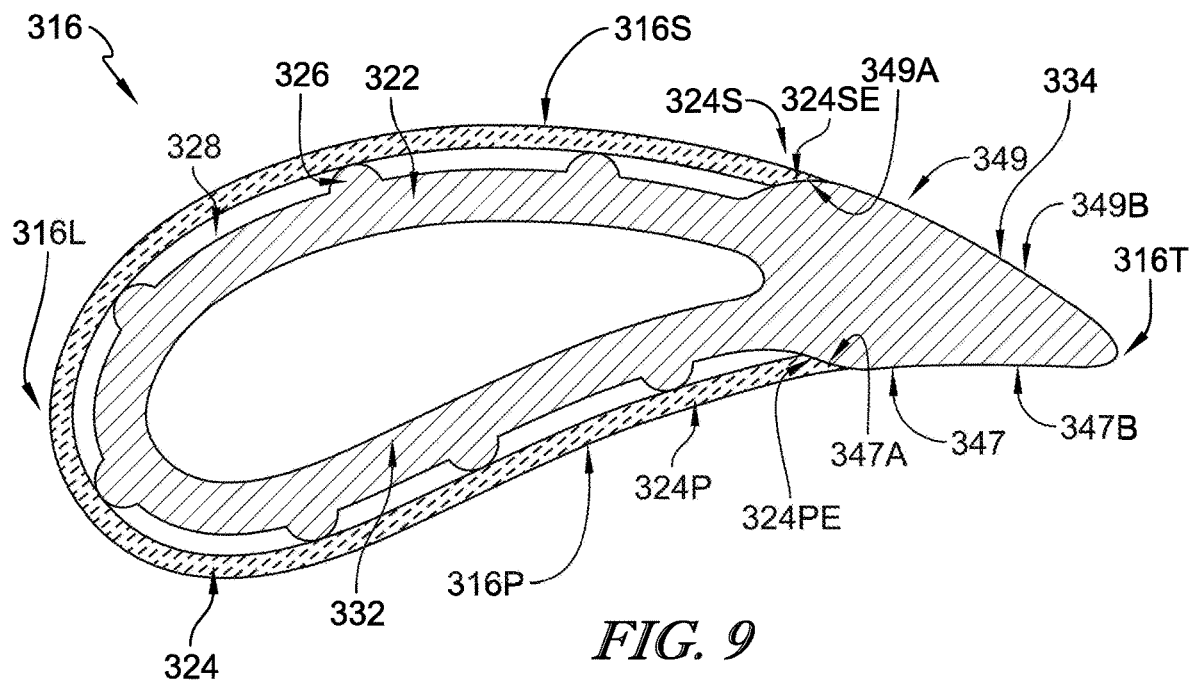
FIG. 9 is a sectional view similar to FIG. 6 of another embodiment of an airfoil in accordance with the present disclosure.

Another illustrative airfoil 316 adapted for use in a gas turbine engine is shown in FIG. 9. The airfoil 316 is substantially similar to the airfoil 16 shown in FIGS. 1-7 and described herein. Accordingly, similar reference numbers in the 300 series indicate features that are common between the airfoil 16 and the airfoil 316. The description of the airfoil 16 is hereby incorporated by reference to apply to the airfoil 316, except in instances when it conflicts with the specific description and drawings of the airfoil 316.

The tail 334 of the spar 322 included in the airfoil 316 includes a first side 347 and a second side 349. The first side 347 forms the aft portion of the pressure side 316P. The second side 349 forms an aft portion of the suction side 316S. Each of the first side 347 and the second side 349 extend from the core body 332 and converge at the trailing edge 316T.

Each of the first side 347 and the second side 349 includes a first segment 347A, 349A and a second segment 347B, 349B as shown in FIG. 9. The first segment 347A of the first side 347 extends between and interconnect the core body 332 with the second segment 347B. The first segment 349A of the second side 349 extends between and interconnects the core body 332 with the second segment 349B. Each of the first segments 347A, 349A generally extend away from the core body 332 at an obtuse angle relative to the core body 332. The second segments 347B, 349B converge at the trailing edge 316T.

The heat shield 324 includes a first end 324P having an edge 324PE located on the pressure side 316P of the airfoil 316 and a second end 324S having an edge 324SE located on a suction side 316S of the airfoil 316, as shown in FIG. 9. The edge 324PE of the first end 324P of the heat shield 324 is generally parallel to the first segment 347A of the first side 347 of the tail 334. The edge 324SE of the second end 324S of the heat shield 324 is generally parallel to the first segment 349A of the second side 349 of the tail 334.

Figure 10:
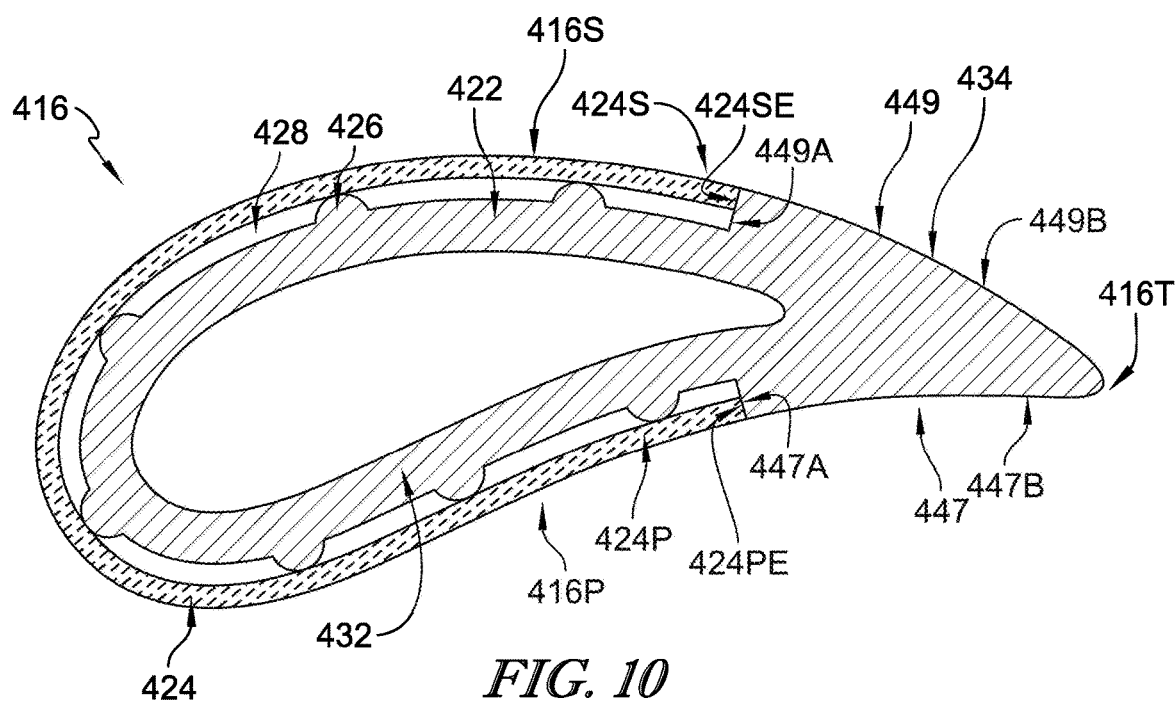
FIG. 10 is a sectional view similar to FIG. 6 of another embodiment of an airfoil in accordance with the present disclosure.

Another illustrative airfoil 416 adapted for use in a gas turbine engine is shown in FIG. 10. The airfoil 416 is substantially similar to the airfoil 16 shown in FIGS. 1-7 and described herein. Accordingly, similar reference numbers in the 400 series indicate features that are common between the airfoil 16 and the airfoil 416. The description of the airfoil 16 is hereby incorporated by reference to apply to the airfoil 416, except in instances when it conflicts with the specific description and drawings of the airfoil 416.

The tail 434 of the spar 422 included in the airfoil 416 extends radially outward from the core body 432 as shown in FIG. 10. The tail 434 includes a first side 447 and a second side 449. The first side 447 forms the aft portion of the pressure side 416P. The second side 449 forms an aft portion of the suction side 416S. Each of the first side 447 and the second side 449 extend from the core body 432 and converge at the trailing edge 416T.

Each of the first side 447 and the second side 449 includes a first segment 447A, 449A and a second segment 447B, 449B as shown in FIG. 10. The first segment 447A of the first side 447 extends between and interconnects the core body 432 with the second segment 447B. The first segment 449A of the second side 449 extends between and interconnects the core body 432 with the second segment 449B. Each of the first segments 447A, 449A extend away from the core body 432 at generally perpendicular angle relative to the core body 432. The second segments 447B, 449B converge at the trailing edge 416T.

The heat shield 424 includes a first end 424P having an edge 424PE located on the pressure side 416P of the airfoil 416 and a second end 424S having an edge 424SE located on a suction side 416S of the airfoil 416, as shown in FIG. 10. The edge 424PE of the first end 424P of the heat shield 424 is generally parallel to the first segment 447A of the first side 447 of the tail 434. The edge 424SE of the second end 424S of the heat shield 424 is generally parallel to the first segment 449A of the second side 449 of the tail 434.

Figure 11:
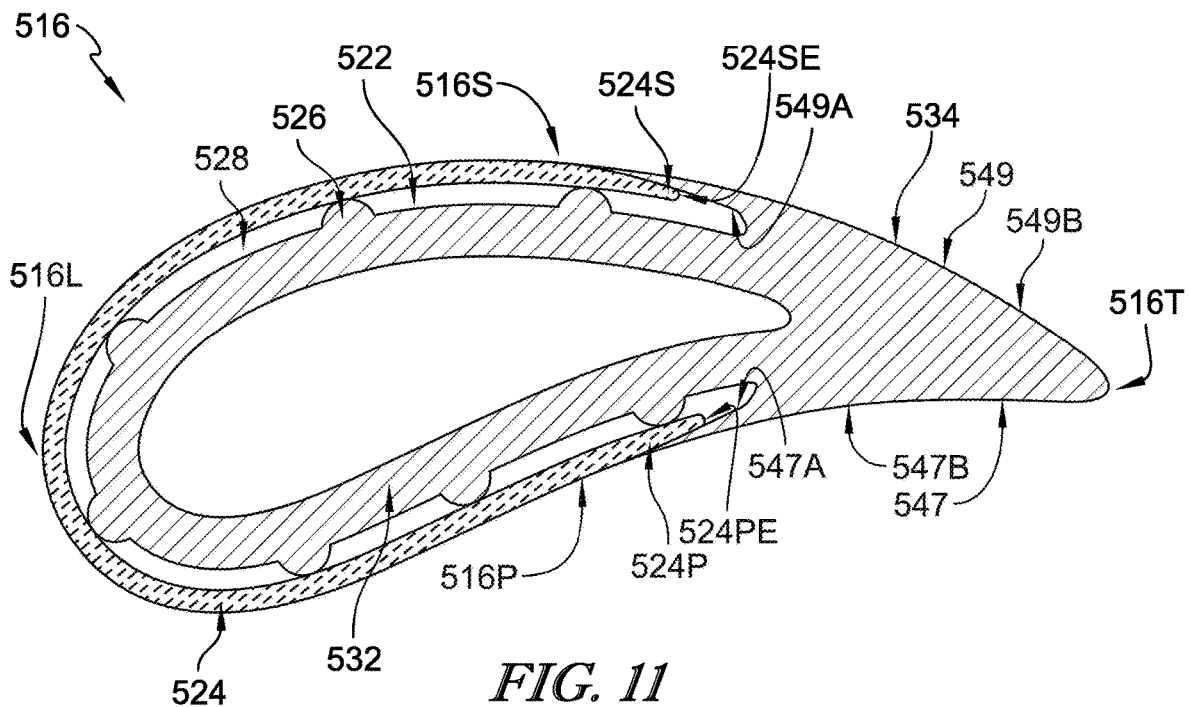
FIG. 11 is a sectional view similar to FIG. 6 of another embodiment of an airfoil in accordance with the present disclosure.

Another illustrative airfoil 516 adapted for use in a gas turbine engine is shown in FIG. 11. The airfoil 516 is substantially similar to the airfoil 16 shown in FIGS. 1-7 and described herein. Accordingly, similar reference numbers in the 500 series indicate features that are common between the airfoil 16 and the airfoil 516. The description of the airfoil 16 is hereby incorporated by reference to apply to the airfoil 516, except in instances when it conflicts with the specific description and drawings of the airfoil 516.

The tail 534 of the spar 522 included in the airfoil 516 extends radially outward from the core body 532 as shown in FIG. 11. The tail 534 includes a first side 547 and a second side 549. The first side 547 forms the aft portion of the pressure side 516P. The second side 549 forms an aft portion of the suction side 516S. Each of the first side 547 and the second side 549 extend from the core body 532 and converge at the trailing edge 516T.

Each of the first side 547 and the second side 549 includes a first segment 547A, 549A and a second segment 547B, 549B as shown in FIG. 11. The first segment 547A of the first side 547 extends between and interconnects the core body 532 with the second segment 547B. The first segment 549A of the second side 549 extends between and interconnects the core body 532 with the second segment 549B. Each of the first segments 547A, 549A extend away from the core body 532 at generally acute angle relative to the core body 532. The second segments 547B, 549B converge at the trailing edge 516T.

The heat shield 524 includes a first end 524P having an edge 524PE located on the pressure side 516P of the airfoil 516 and a second end 524S having an edge 524SE located on a suction side 516S of the airfoil 516, as shown in FIG. 11. The heat shield 524 is arranged so the edge 524PE of the first end 524P is located between a portion of the first segment 547A of the first side 547 of the tail 534 and the core body 532 and the edge 524SE of the second end 524S is located between a portion of the first segment 549A of the second side 549 of the tail 534 and the core body 532. The segments 547A, 549A block the heat shield 524 from separating from the spar 522 due to ballooning, for example.

Figure 12:
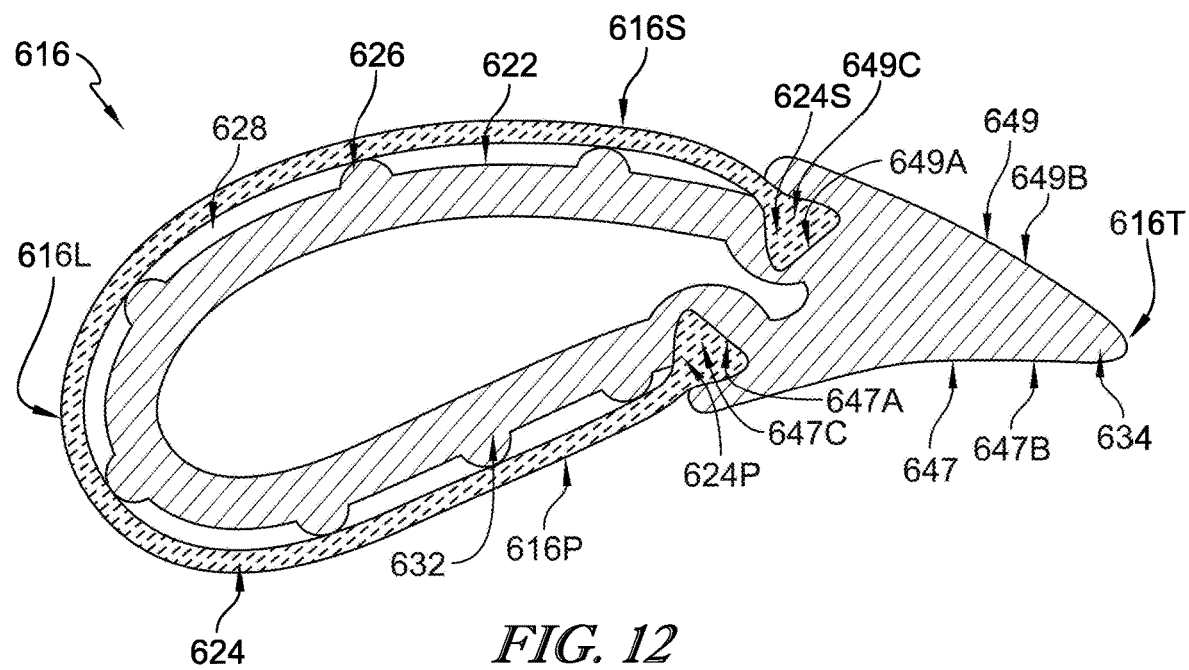
FIG. 12 is a sectional view similar to FIG. 6 of another embodiment of an airfoil in accordance with the present disclosure.

Another illustrative airfoil 616 adapted for use in a gas turbine engine is shown in FIG. 12. The airfoil 616 is substantially similar to the airfoil 16 shown in FIGS. 1-7 and described herein. Accordingly, similar reference numbers in the 600 series indicate features that are common between the airfoil 16 and the airfoil 616. The description of the airfoil 16 is hereby incorporated by reference to apply to the airfoil 616, except in instances when it conflicts with the specific description and drawings of the airfoil 616.

The tail 634 of the spar 622 included in the airfoil 616 extends radially outward from the core body 632 as shown in FIG. 12. The tail 634 includes a first side 647 and a second side 649. The first side 647 forms the aft portion of the pressure side 616P. The second side 649 forms an aft portion of the suction side 616S. Each of the first side 647 and the second side 649 extend from the core body 632 and converge at the trailing edge 616T.

Each of the first side 647 and the second side 649 includes a first segment 647A, 649A and a second segment 647B, 649B as shown in FIG. 12. The first segment 647A of the first side 647 extends between and interconnects the core body 632 with the second segment 647B. The first segment 649A of the second side 649 extends between and interconnects the core body 632 with the second segment 649B. Each of the first segments 647A, 649A are formed to be generally circular heat shield receivers 647C, 649C each having an inner circumference. The second segments 647B, 649B extend from the first segments 647A, 649A and converge at the trailing edge 616T.

The heat shield 624 includes a generally circular first end 624P having an outer circumference located on the pressure side 616P of the airfoil 616 and a second end 624S having an outer circumference located on a suction side 616S of the airfoil 616, as shown in FIG. 12. The heat shield 624 is arranged so a portion of the outer circumference of the first end 624P is located within portion of the inner circumference of the heat shield receiver 647C of the first side 647 of the tail 634 to form a dovetail joint and a portion of the outer circumference of the second end 624S is located within a portion of the inner circumference of the heat shield receiver 649C of the second side 649 of the tail 634 to form a dovetail joint to interlock the heat shield 624 with the tail 634. The joints block the heat shield 624 from separating from the spar 622 due to ballooning, for example.

Figure 13:
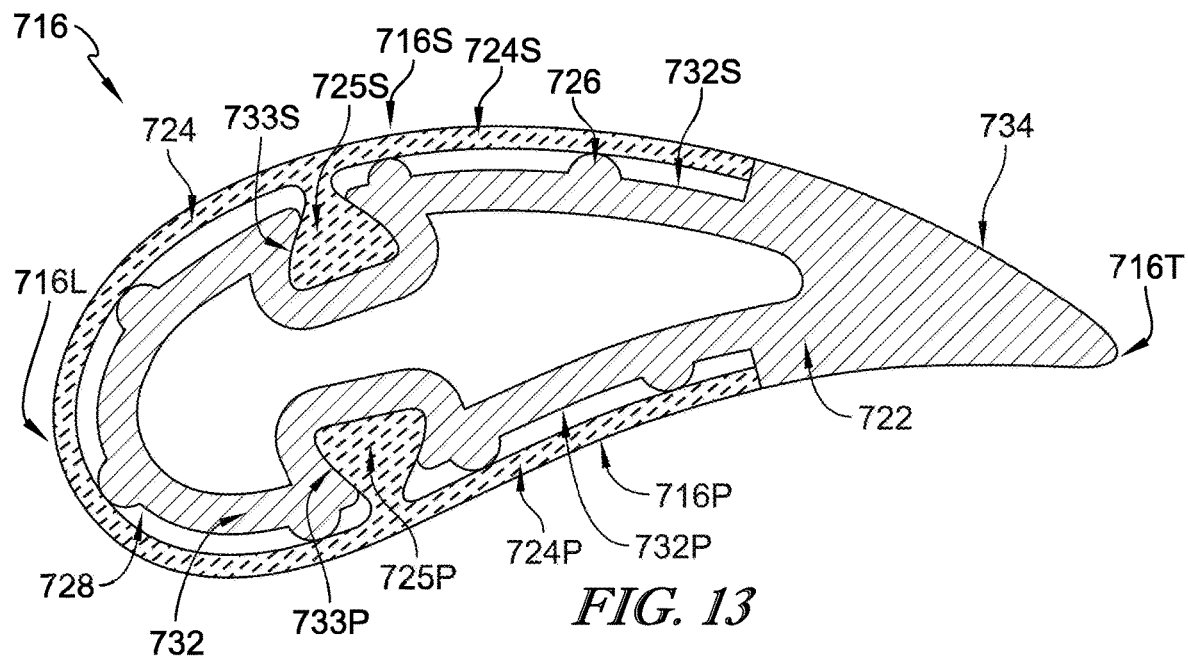
FIG. 13 is a sectional view similar to FIG. 6 of another embodiment of an airfoil in accordance with the present disclosure.

Another illustrative airfoil 716 adapted for use in a gas turbine engine is shown in FIG. 13. The airfoil 716 is substantially similar to the airfoil 16 shown in FIGS. 1-7 and described herein. Accordingly, similar reference numbers in the 700 series indicate features that are common between the airfoil 16 and the airfoil 716. The description of the airfoil 16 is hereby incorporated by reference to apply to the airfoil 716, except in instances when it conflicts with the specific description and drawings of the airfoil 716.

The core body 732 includes a suction side segment 732S located on the suction side 716S and a pressure side segment 732P located on a pressure side 716P, as shown in FIG. 13. Each of the suction side segment 732S and the pressure side segment 732P are formed to include a socket 733S, 733P. Illustratively, the sockets 733S, 733P are dovetail shaped to location a portion of the heat shield 724 therein and interlock the heat shield 724 with the core body 732 of the spar 722. The segments 732S, 732P form dovetail joints with the sockets 733S, 733P to block the heatshield 724 from separating from the spar 722 due to ballooning, for example.

The heat shield 724 includes a suction side segment 724S forming a portion of the suction side 716S of the airfoil and a pressure side segment 724P forming a portion of the pressure side 716P of the airfoil 716 as shown in FIG. 13. Each of the suction side segment 724S and the pressure side segment 724P are formed to include a dovetail 725P, 725S extending towards the core body 732. The dovetail 725P extending from the pressure side segment 724P is located within the socket 733P. The tail 725S extending from the suction side segment 724S is located within the socket 733S to interlock the heat shield 724 with the spar 722.

Figure 14:
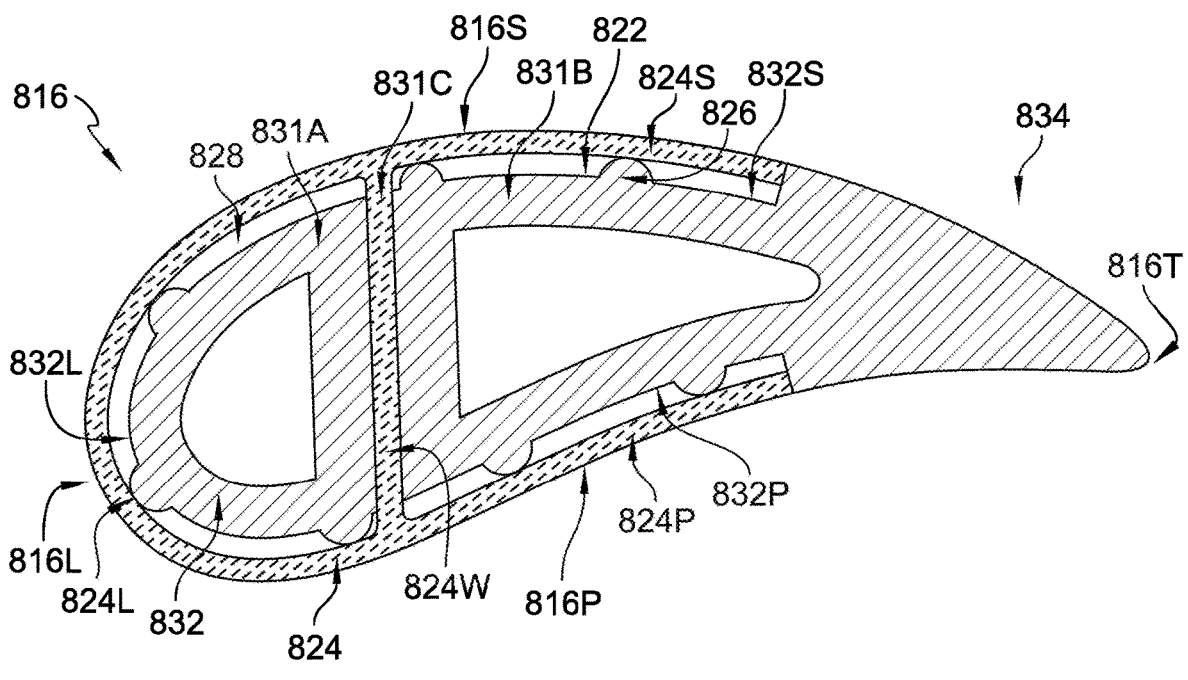
FIG. 14 is a sectional view similar to FIG. 6 of another embodiment of an airfoil in accordance with the present disclosure.

Another illustrative airfoil 816 adapted for use in a gas turbine engine is shown in FIG. 14. The airfoil 816 is substantially similar to the airfoil 16 shown in FIGS. 1-7 and described herein. Accordingly, similar reference numbers in the 800 series indicate features that are common between the airfoil 16 and the airfoil 816. The description of the airfoil 16 is hereby incorporated by reference to apply to the airfoil 816, except in instances when it conflicts with the specific description and drawings of the airfoil 816.

The core body 832 of the spar 822 includes a forward spar portion 831A, and an aft spar portion 831B as shown in FIG. 14. The forward spar portion 831A forms a leading edge segment 832L located along the leading edge 816L of the airfoil 816. The aft spar portion 831B forms a suction side segment 832S located on the suction side 816S and a pressure side segment 832P located on the pressure side 816P, and the airfoil 816, as shown in FIG. 14. The forward spar portion 831A and the aft spar portion 831B cooperate to form a heat shield channel 831C that extends from the suction side segment 832S to the pressure side segment 832P.

The heat shield 824 includes a suction side segment 824S, a pressure side segment 824P, a leading edge segment 824L, and a web 824W as shown in FIG. 14. The suction side segment 824S extends from the leading edge segment 824L to the tail 834 and forms a forward portion of the suction side 816S of the airfoil 816. The pressure side segment 824P extends from the leading edge segment 824L to the tail 834 and forms a forward portion of the pressure side 816P of the airfoil 816. The leading edge segment 824L extends from the pressure side segment 824P to the suction side segment 824S and forms the leading edge 816L of the airfoil 816. The web 824W extends though the heat shield channel 831C between the forward spar portion 831A and the aft spar portion 831B to interconnect the suction side segment 824S with the pressure side segment 824P and block movement of the heat shield 824 relative to the spar 822.

Figure 15:
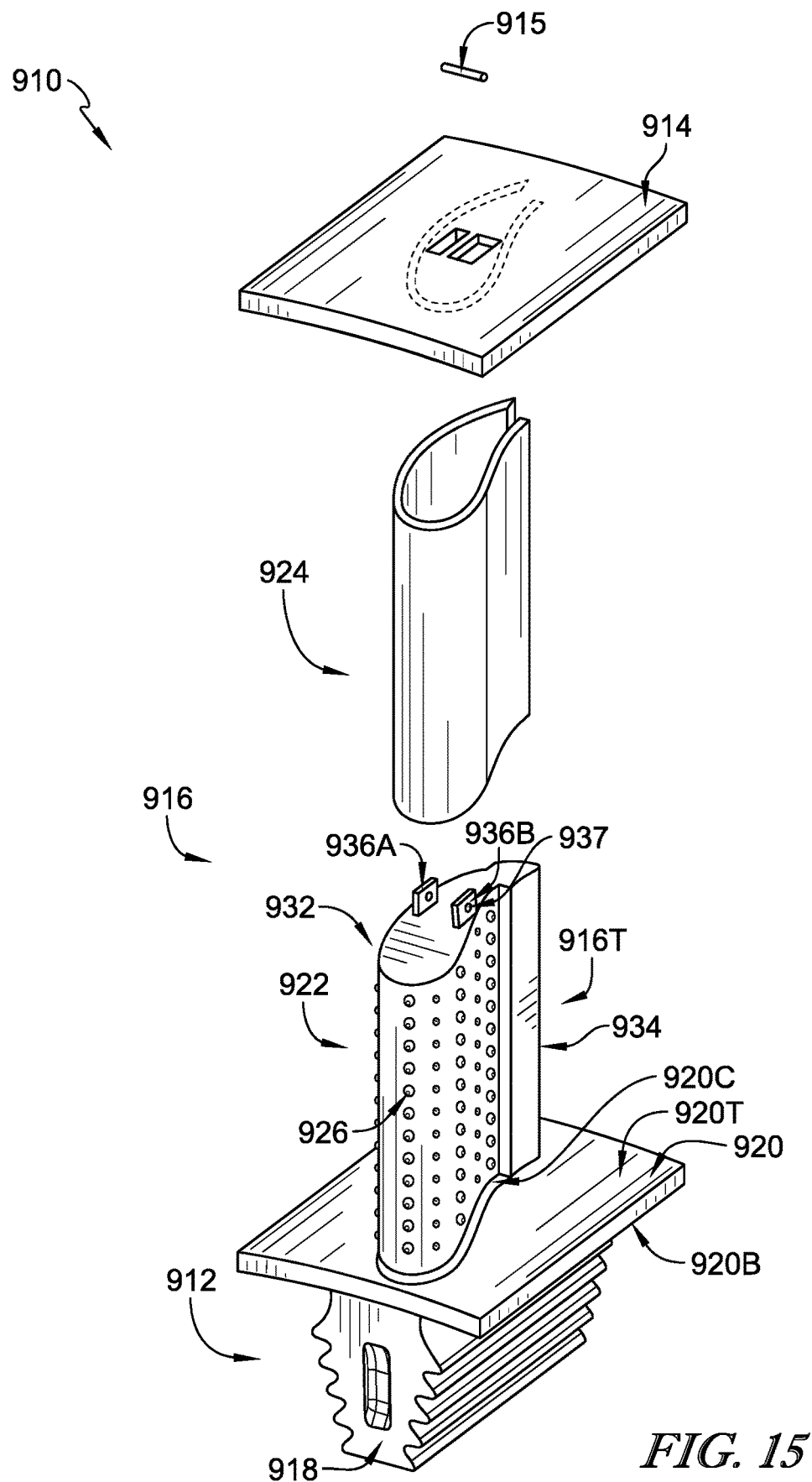
FIG. 15 is an exploded assembly view of another embodiment of a turbine-blade assembly in accordance with the present disclosure for use in the gas turbine engine of FIG. 1 showing that the tip shroud and the root of the assembly are formed to include c-shaped channels arranged to receive a portion of the heat shield to block movement of the heat shield relative to the spar.
Figure 16:
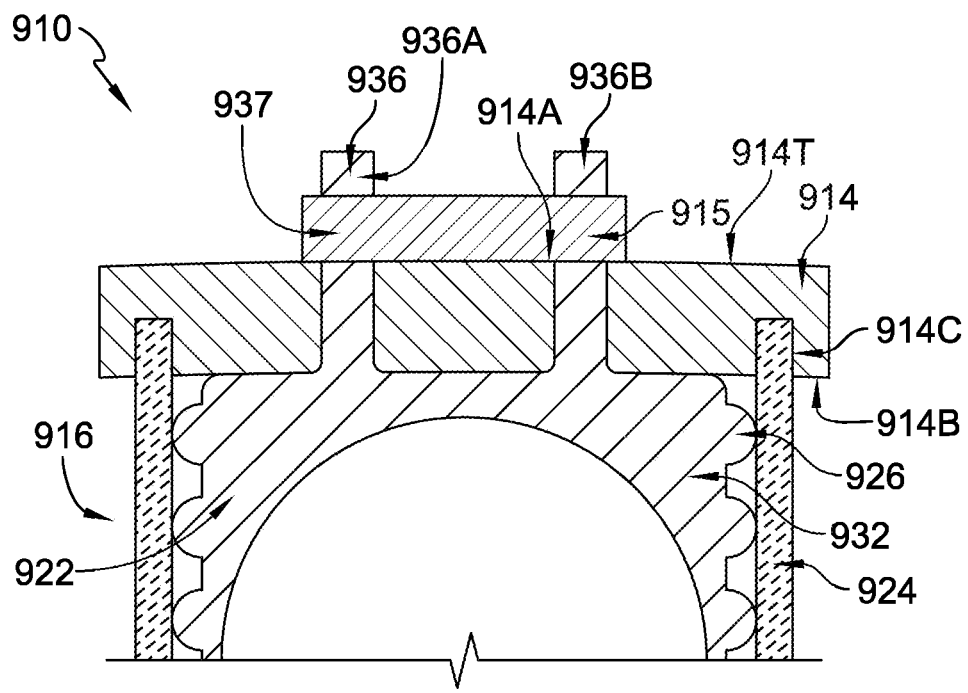
FIG. 16 is a sectional view of the turbine-blade assembly shown in FIG. 15 showing an airfoil retainer extending from the spar through a retainer aperture formed in the tip shroud and that the insert pin extends through the airfoil retainer to couple the tip shroud to the spar.

Another illustrative turbine-blade assembly 910 adapted for use in a gas turbine engine is shown in FIGS. 15 and 16. The turbine-blade assembly 910 is substantially similar to the turbine-blade assembly 10 shown in FIGS. 1-7 and described herein. Accordingly, similar reference numbers in the 900 series indicate features that are common between the turbine-blade assembly 10 and the turbine-blade assembly 910. The description of the turbine-blade assembly 10 is hereby incorporated by reference to apply to the turbine-blade assembly 910, except in instances when it conflicts with the specific description and drawings of the turbine-blade assembly 910.

The turbine-blade assembly 910 includes a root 912, a tip shroud 914, and an airfoil 916 extending between the root 912 and the tip shroud 914 as shown in FIG. 15. In the illustrative embodiment, the spar 922 comprises metallic materials and is formed to include a core body 932, a tail 934, and an airfoil-retainer 936 as shown in FIGS. 15 and 16. The core body 932 is arranged to support the heat shield 924. The tail 934 extends axially away from the core body 932 and forms the trailing edge 916T of the airfoil 916. The airfoil retainer 936 is configured to couple the spar 922 to the tip shroud 914 with an insert pin 915.

The platform 920 includes a top surface 920T, a channel 920C, and a bottom surface 920B as shown in FIG. 15. The top surface 920T faces the tip shroud 914 and the bottom surface 920B faces away from the top surface 920T. The channel 920C is formed on the top surface 920T and extends around the core body 932 of the spar 922 to locate a portion of the heat shield 924 therein.

The tip shroud 914 includes a bottom surface 914B, a top surface 914T, an airfoil retainer aperture 914A, and a channel 914C, as shown in FIGS. 15 and 16. The bottom surface 914B faces the root 912. The top surface 914T faces outwardly away from the airfoil 916. The airfoil retainer aperture 914A is arranged to extend through the tip shroud 914 from the top surface 914T to the bottom surface 914B. The airfoil retainer aperture 914A is configured to locate a portion of the airfoil retainer 936 therein.

The tip shroud 914 further includes a channel 914C formed in the bottom surface. The channel 914C extends around the core body 932 of the spar 922 to locate a portion of the heat shield 924 therein. The channel 914C of the tip shroud 914 cooperates with the channel 920C of the platform 920 to secure the heat shield 924 therebetween. Securing the heat shield 924 between the platform 920 and the tip shroud 914 may prevent ballooning of the heat shield 924 during use of the turbine-blade assembly 910.

The airfoil retainer 936 includes a first knife edge 936A and a second knife edge 936B spaced-apart from the first knife edge 936A as shown in FIG. 16. Each of the first knife edge 936A and the second knife edge 936B extend upwardly from the spar 922 through the airfoil retainer aperture 914A. Each of the first knife edge 936A and the second knife edge 936B is formed to include an aperture 937. The apertures 937 are arranged to locate the insert pin 915 there through to locate the tip shroud 914 between the insert pin 915 and the core body 932.

Figure 17:
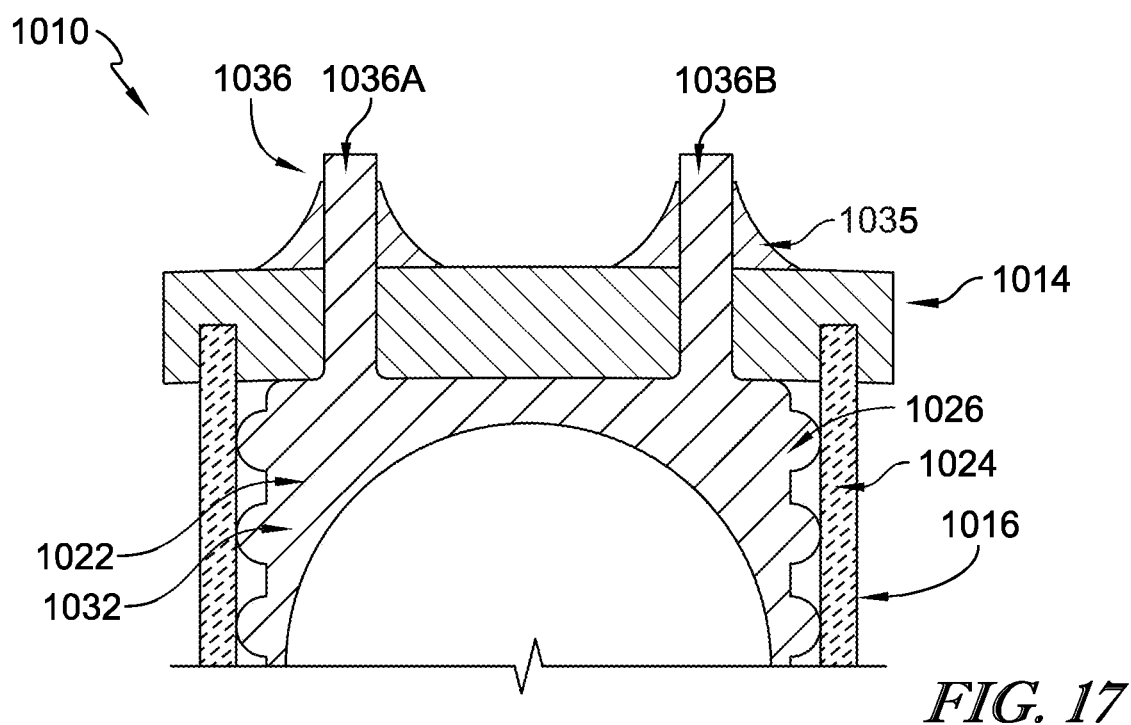
FIG. 17 is a sectional view similar to FIG. 16 showing the airfoil retainer included in the spar extending through the tip shroud and the airfoil retainer is brazed to the tip shroud to couple the tip shroud to the spar.

Another illustrative turbine-blade assembly 1010 adapted for use in a gas turbine engine is shown in FIG. 17. The turbine-blade assembly 1010 is substantially similar to the turbine-blade assembly 10, 910 shown in FIGS. 1-7 and 15-16 and described herein. Accordingly, similar reference numbers in the 1000 series indicate features that are common between the turbine-blade assemblies 10, 910 and the turbine-blade assembly 1010. The description of the turbine-blade assemblies 10, 910 are hereby incorporated by reference to apply to the turbine-blade assembly 1010, except in instances when it conflicts with the specific description and drawings of the turbine-blade assembly 1010.

The turbine-blade assembly 1010 includes a root, a tip shroud 1014, and an airfoil 1016. The tip shroud 1014 and the root locate the airfoil 1016 therebetween. The airfoil 1016 includes a spar 1022 and a heat shield 1024. The heat shield 1024 is arranged to extend around a portion of the spar 1022.

The spar 1022 includes a core body 1032, and an airfoil retainer 1036. The airfoil retainer cooperates with the tip shroud 1014 to secure the heat shield 1024 to the airfoil 1016.

The airfoil retainer includes a first knife edge 1036A and a second knife edge 1036B that extend through the tip shroud 1014 as shown in FIG. 17. Illustratively, the first knife edge 1036A and the second knife edge 1036B are brazed to the tip shroud to form joint 1035 to secure the tip shroud 1014 to the spar 1022. In another embodiment the joint 1035 is a weld or any other suitable means of securing the material together.

Figure 18:
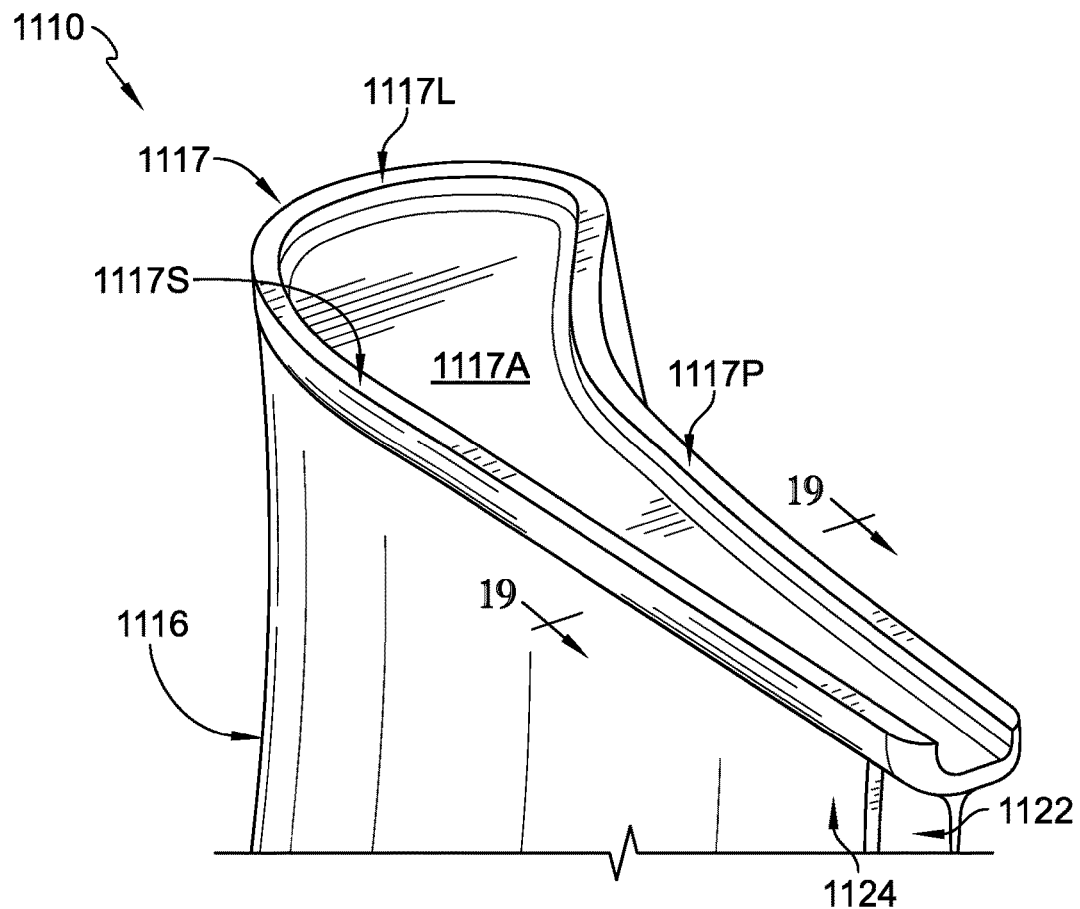
FIG. 18 is a perspective view of another embodiment of an airfoil in accordance with the present disclosure for use in the gas turbine engine of FIG. 1 showing a winglet coupled to the spar to block movement of the heatshield relative to the spar.
Figure 19:
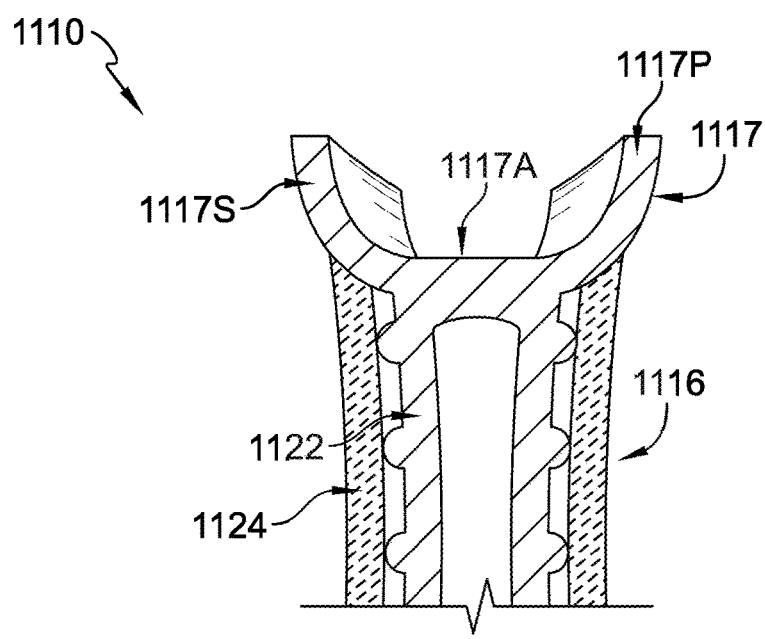
FIG. 19 is a sectional view taken along line 19-19 of FIG. 18 showing the winglet engaged with the heat shield to block movement of the heat shield relative to the spar.

Another illustrative turbine-blade assembly 1110 adapted for use in a gas turbine engine is shown in FIGS. 18 and 19. The turbine-blade assembly 1110 is substantially similar to the turbine-blade assembly 10 shown in FIGS. 1-7 and described herein. Accordingly, similar reference numbers in the 1100 series indicate features that are common between the turbine-blade assembly 10 and the turbine-blade assembly 1110. The description of the turbine-blade assembly 10 is hereby incorporated by reference to apply to the turbine-blade assembly 1110, except in instances when it conflicts with the specific description and drawings of the turbine-blade assembly 1110.

The turbine-blade assembly 1110 includes an airfoil 1116 and a winglet 1117 as shown in FIGS. 18 and 19. The airfoil 1116 forms a pressure side 1116P, a suction side 1116S, and a leading edge 1116L. The airfoil 1116 includes a spar 1122 and a heat shield 1124. The winglet 1117 is coupled to the spar 1122 to block radial movement of the heat shield 1124 relative to the spar 1122.

The winglet 1117 includes a suction side segment 1117S, a pressure side segment 1117P, a leading edge segment 1117L, and a retainer 1117A, as shown in FIGS. 18 and 19. The suction side segment 1117S is located on the suction side of 1116S of the airfoil 1116. The pressure side segment 1117P is located on the pressure side 1116P of the airfoil 1116. The leading edge segment 1117L extends from the pressure side segment 1117P to the suction side segment 1117S along the leading edge 1116L of the airfoil 1116.

The retainer 1117A extends between and interconnects the suction side segment 1117S, the pressure side segment 1117P, and the leading edge segment 1117L. Each of the suction side segment 1117S, the pressure side segment 1117P, and the leading edge segment 1117L extend arcuately upward from the airfoil 1116 so that a portion of each of the suction side segment 1117S, the pressure side segment 1117P, and the leading edge segment 1117L extends over the heat shield 1124.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil adapted for use in a gas turbine engine, the airfoil comprising
a spar comprising metallic materials and formed to include a core body and a tail, the tail shaped to form an aft portion and a trailing edge of the airfoil, the aft portion defining an aft portion of a pressure side of the airfoil and an aft portion of a suction side of the airfoil, the tail defining an outermost surface of the airfoil adapted to be exposed to a gas path on the pressure side of the airfoil and the suction side of the airfoil, and
a single-piece heat shield comprising ceramic matrix composite materials and shaped to extend around the core body to form a leading edge of the airfoil, a forward portion of the pressure side of the airfoil, and a forward portion of the suction side of the airfoil,
wherein the forward portion of the pressure side of the airfoil is greater than half of the pressure side of the airfoil and the forward portion of the suction side of the airfoil is greater than half of the suction side of the airfoil,
wherein the core body includes a forward spar portion and an aft spar portion that is spaced-apart from the forward spar portion to define a heat shield channel therebetween, the tail is integrally formed with the aft spar portion, the single-piece heat shield is formed to include a suction side segment, a pressure side segment, a leading edge segment, and a web, the suction side segment and the pressure side segment are integrally formed with the web and extend in an aft direction from the web toward the tail such that the suction side segment and the pressure side segment have free ends that are cantilevered from the web, the leading edge segment extends from the pressure side segment to the suction side segment, and the web extends through the heat shield channel between the forward spar portion and the aft spar portion to interconnect the suction side segment with the pressure side segment.

2. The airfoil of claim 1, wherein the core body includes a cavity and the tail is formed to include a trailing edge vent passage that extends from the cavity to the trailing edge.

3. A turbine-blade assembly adapted for use in a gas turbine engine, the turbine-blade assembly comprising
a root including a root platform and a stem adapted to attach the turbine-blade assembly to the gas turbine engine for rotation about a central axis of the gas turbine engine,
an airfoil including a spar comprising metallic materials and a heat shield comprising ceramic materials, the spar extending outward from the root platform and formed to include a core body, a tail forming a trailing edge of the airfoil, and an airfoil retainer extending outwardly away from the core body, the heat shield shaped to extend around the core body to form a leading edge, a forward portion of a pressure side of the airfoil, and a forward portion of a suction side of the airfoil, the heat shield located in spaced-apart relation to the core body to define cooling passages between the spar and the heat shield, and
a tip shroud spaced-apart from the root, the tip shroud formed to include an airfoil retainer aperture extending through the tip shroud, and configured to receive the airfoil retainer of the spar therethrough to couple the spar to the tip shroud,
wherein a plurality of rigid load supports extend between the spar and the heat shield, the plurality of rigid load supports are integrally formed with the core body of the spar, and the plurality of rigid load supports are generally hemi-spherical,
wherein the heat shield further includes a first end and a second end spaced apart from the first end, the first end having an outer circumference located on the pressure side of the airfoil and the second end having an outer circumference located on a suction side of the airfoil,
wherein the tail includes a first side extending from the trailing edge towards the forward portion of the pressure side of the airfoil and a second side spaced apart from the first side and extending from the trailing edge towards the forward portion of the suction side of the airfoil, the first side is formed to include a first heat shield receiver having an first inner circumference and the second side is formed to include a second heat shield receiver having a second inner circumference,
wherein the heat shield is arranged so a portion of the outer circumference of the first end is located within a portion of the first inner circumference of the heat shield receiver of the first side of the tail to form a first dovetail joint and a portion of the outer circumference of the second end is located within a portion of the second inner circumference of the heat shield receiver of the second side of the tail to form a second dovetail joint.

4. The turbine-blade assembly of claim 3, wherein the airfoil further includes a plurality of discrete rigid load supports that extend between the spar and the heat shield.

5. The turbine-blade assembly of claim 4, wherein the airfoil retainer includes a first knife edge configured to couple the airfoil retainer to the spar, an insert pin, and an aperture arranged to receive the insert pin so the tip shroud is located between the insert pin and the core body.

* * * * *